(12) United States Patent
Mori

(10) Patent No.: US 7,510,420 B2
(45) Date of Patent: Mar. 31, 2009

(54) ROTATING UNIVERSAL SERIAL BUS HUB

(75) Inventor: Kenneth Mori, Los Angeles, CA (US)

(73) Assignee: Belkin International, Inc., Compton, CA (US)

(*) Notice: Subject to any disclaimer, the term of this patent is extended or adjusted under 35 U.S.C. 154(b) by 0 days.

(21) Appl. No.: 11/673,442

(22) Filed: Feb. 9, 2007

(65) Prior Publication Data

US 2008/0194119 A1 Aug. 14, 2008

(51) Int. Cl.
*H01R 13/56* (2006.01)
(52) U.S. Cl. .............................. 439/446; 379/446; 439/8
(58) Field of Classification Search ................ 439/446, 439/31, 165, 467, 265, 8; 379/446
See application file for complete search history.

(56) References Cited

U.S. PATENT DOCUMENTS

| 5,860,824 | A | * | 1/1999 | Fan ............................ 439/265 |
| 6,116,958 | A | | 9/2000 | Reichle |
| 6,366,672 | B1 | * | 4/2002 | Tsay ........................... 379/446 |
| 6,394,813 | B1 | | 5/2002 | Stout et al. |
| 6,695,620 | B1 | | 2/2004 | Huang |
| 6,786,743 | B2 | * | 9/2004 | Huang ......................... 439/131 |
| 6,894,864 | B2 | | 5/2005 | Chang et al. |
| 7,012,403 | B2 | * | 3/2006 | Hwang ........................ 320/107 |
| 7,025,595 | B1 | * | 4/2006 | Chan et al. ..................... 439/6 |
| 7,172,428 | B2 | * | 2/2007 | Huang .......................... 439/11 |
| 2004/0017677 | A1 | | 1/2004 | Krietzman |
| 2004/0023520 | A1 | | 2/2004 | Schriefer |
| 2004/0215966 | A1 | | 10/2004 | Elteto |
| 2006/0259677 | A1 | | 11/2006 | Rosenfield |

* cited by examiner

*Primary Examiner*—Michael C Zarroli
(74) *Attorney, Agent, or Firm*—O'Melveny & Myers LLP

(57) ABSTRACT

A connector hub apparatus is provided that can rotate along two different axes in two different planes with respect to an upstream connector plug, so that the hub can be easily positioned in a variety of configurations In one embodiment of the present invention, the connector hub apparatus comprises a first body with a plurality of downstream connectors, a second body with an upstream connector operatively coupled to the plurality of downstream connectors, a ratcheting mechanism that allows the first body to rotate to a first set of predetermined positions within a first plane, and a hinge that allows the second body to rotate to a second set of predetermined positions within a second plane, wherein the second plane is perpendicular with respect to the first plane.

21 Claims, 3 Drawing Sheets

ROTATING UNIVERSAL SERIAL BUS HUB

BACKGROUND OF THE INVENTION

1. Field of the Invention

The present invention relates generally to a serial hub apparatus and more particularly, to a serial hub apparatus with at least one upstream port connector that can rotate in a plurality of directions with respect to a plurality of downstream port connectors.

2. Description of Related Art

In many applications, it is advantageous to interconnect a single serial computer port to multiple peripheral devices. A hub apparatus or hub provides a convenient central data connection point for attaching multiple peripheral devices to a computer. The hub relays data from the computer to all enabled devices connected to the data hub, and relays data from the enabled devices to the computer. This data relay can be performed without any data storage or significant delay. The hub can be connected to the computer via a single upstream connector. The hub can include a plurality of downstream ports for connecting the peripheral devices to the hub. Hubs utilize standardized connectors at the upstream and downstream ports to provide universal connectivity between peripheral devices and the computer, thus simplifying these connections. Hub assemblies utilizing serial data transfer protocols and the corresponding electrical or electro-optical connectors operate similarly. Exemplary protocols that can be used with hub assemblies include Universal Serial Bus ("USB"), IEEE 1394 ("Fire Wire"), PS2, and RS232.

Conventional USB hubs receive power for low power applications via a positive voltage conductor and a ground conductor from a source, such as the computer, through the upstream port. Conventional USB hubs can operate in the so-called "self-powered" mode when equipped with a connector for connecting with a transformer plugged into a typical AC outlet for providing DC power to the hub for high power applications.

The USB standard is a communication interface standard that enables data transmission/reception between a single USB host and a plurality of USB devices. USB standard compliant interfaces have been widely used as a communication interface that mainly defines a PC as the USB host and its peripheral devices as the USB devices to enable connection between the PC and the peripheral devices. The USB standard adopts a star-shaped logical bus topology in which a single USB host is connected with plural USB devices. The USB 2.0 standard defines three bus transport speeds: a low speed ("LS") of 1.5 Mbits, a full speed ("FS") of 12 Mbits, and a high speed ("HS") of 480 Mbits. Most USB 2.0 hubs are backward compatible to the USB 1.1 standard that includes the LS and FS bus transport speeds.

Laptop computers often have only one or two type "A" USB ports available and they are commonly either located on the back or side of the laptop computer and little clearance is provided around the connectors for plugging in travel hubs or some of the larger USB devices that are integrated into the male USB connectors. If adequate clearance is available, to reduce the size of travel hubs and the cables the user needs to carry around while traveling, it would be preferable if the travel hub could plug directly into one of the laptop computer's USB ports similar to a USB flash memory drive. A number of such devices with one, two or even three USB ports molded into one rigid molded unit are currently available. Unfortunately, this solution is often not practical for the user to deploy in her situation, unless she makes use of an upstream extension cable, as the hub would block the user's access to other cables and devices plugged into the laptop. The use of an extension cable to get around the clearance problems thus defeats much of the benefits of using a single molded hub unit. Thus, many travel hub manufacturers settle for an alternative solution of having an integrated male type "A" USB connector and upstream cable permanently attached to the travel hub. When not in use, the upstream cable can be stored by folding it, coiling it into a bundle, or wrapping it around the circumference of the travel hub.

Some existing travel hubs attempt to solve the clearance problem by having a type "A" USB port that swivels in one direction but, this solution still does not always allow the hub to be positioned properly for adequate clearance to adjacent ports and connectors. An improved USB hub design would allow the user to easily position and connect her travel hub in a plurality of directions directly to the USB ports on her laptop computer, and would eliminate the use of an upstream cable and an extension cable when connecting a travel hub to one of her laptop computer's USB ports.

USB hubs can be configured in a variety of shapes and sizes with a varying number of ports, commonly ranging from 2 to 7 ports. Small portable hubs meant to be used with a laptop computer are commonly referred to as "travel hubs" with two to four available bus-powered ports. Often, when a laptop user docks her computer at home or work, she needs a USB hub that has more than the two to four bus-powered ports. That is, she is in need of self-powered ports, as described above. Until now, this meant that the laptop user needed to purchase two hubs, i.e., a travel hub and a larger conventional USB hub, to get additional ports with the DC powered port option.

Accordingly, there is a need for a small DC-powered hub that can be easily positioned in a plurality of directions, and folded and used in a compact shape, saving weight and space for the user.

SUMMARY OF THE INVENTION

The present invention provides a rotatable connector hub apparatus, in which a first portion of the hub contains downstream port connectors that can rotate along two different axes in two different planes from a second portion of the hub apparatus that is attached to an upstream port connector. By rotating the portions of the hub apparatus to the appropriate positions, connector orientation problems and physical clearance of the apparatus with adjacent ports and connectors are eliminated or at least reduced. Such problems can occur when the upstream port of the hub apparatus is connected to a compatible port connector of another device and is prevalent when a user attempts to connect accessories to her laptop computer. The following embodiments of the invention are described in terms of USB port connectors and are illustrative only. The embodiments are not to be considered limiting in any respect, as the invention can work equally well with a variety of types of electrical and electro-optical serial port connectors types that employ other protocols such as Fire Wire, RS232 and PS2.

In one embodiment, the hub apparatus is a USB hub that has a ratcheting mechanism that allows a first portion of the USB hub apparatus to be adjusted to a set of predetermined positions within a first plane. Once set by the user, the position remains fixed until the user affirmatively moves the apparatus. A second portion of the apparatus can similarly be adjusted to a second set of predetermined positions within a second plane that is perpendicular to the first plane.

The USB hub can be folded into a compact configuration that saves space. The compact configuration allows the apparatus to be easily packed into a user's luggage for travel when disconnected from her computer. Additionally, in situations where there is adequate clearance to adjacent ports and connectors on the user's laptop, the apparatus can electrically operate in this compact configuration. The USB hub can operate as a bus-powered hub or as a self-powered hub when connected to a compatible power source such as an AC power transformer.

A more complete understanding of the hub apparatus that can be rotated in two different planes will be afforded to those skilled in the art, as well as a realization of additional advantages and objects thereof, by consideration of the following detailed description of the preferred embodiment. Reference will be made to the appended sheets of drawings, which are described below.

DETAILED DESCRIPTION OF THE PREFERRED EMBODIMENT

The present invention provides a rotatable connector hub apparatus, in which a first portion of the hub contains a plurality of downstream port connectors that can rotate along two different axes from a second portion of the hub apparatus that is attached to at least one upstream port connector. The hub apparatus can be physically positioned in a variety of configurations to avoid clearance and connector orientation problems with adjacent ports and connectors when the upstream port of the hub apparatus is connected to another device. The following embodiments of the invention are described in terms of USB port connectors and are illustrative only, and are not to be considered limiting in any respect. In the detailed description that follows, like element numerals are used to indicate like elements appearing in one or more of the figures.

Figure 1:
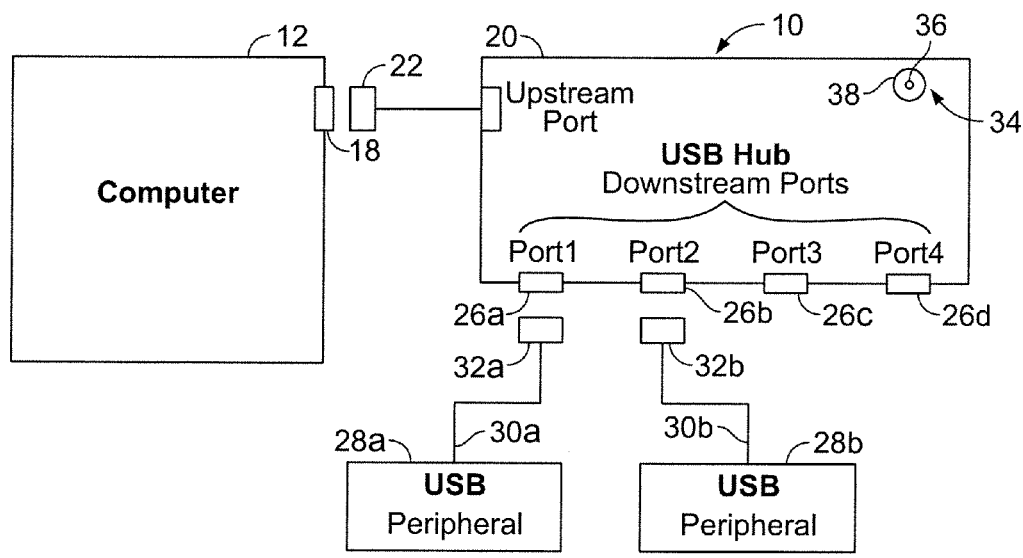
FIG. 1 is a block diagram illustrating a conventional USB hub.

FIG. 1 is a block diagram illustrating the connection of a USB hub 10 to a computer 12. The computer 12 has a USB interface that includes a master data hub 14 for receiving data from the USB hub 10. The computer 12 includes at least one USB port connector 18. The USB hub 10 includes an upstream port connector 20 having a corresponding USB plug 22 that connects to the USB connector 18 of the computer 12.

The USB hub 10 also includes a plurality of downstream USB port connectors 26a-26d that permit multiple USB peripheral devices 28a and 28b, such as a keyboard, mouse, scanner, or printer, to be coupled to the computer 12 through the USB hub 10. The USB peripheral devices 28a and 28b are each connected by connection cables 30a and 30b to USB plugs 32a and 32b, which mate with the downstream port connectors 26a-26d of the USB hub 10.

The USB hub 10 can contain connections for receiving power in two ways. First, the USB hub may be bus-powered for applications in which total current provided to the hub is less than approximately 500 mA. In bus-powered applications, the USB hub receives power through the upstream port 20 from the USB plug 22 that contains separate positive and ground conductors. The USB hub can transfer a limited amount of current, approximately 100 mA, to each of four devices through the downstream ports 24 via positive and ground conductors in the downstream port connectors 26a-26d.

The USB hub 10 can also include a separate power connector 34 for receiving sufficient power to supply the higher current demands to the downstream ports 24 in high power applications when the hub is operated in the self-powered mode. The available current draw through the downstream ports in such powered applications is approximately 500 mA per port. The power connector 34 includes a positive voltage conductor 36 and a ground conductor 38 for receiving a DC voltage, preferably 5 volts, from a transformer (not shown) connected to an AC powered outlet (also not shown).

Figure 2A:
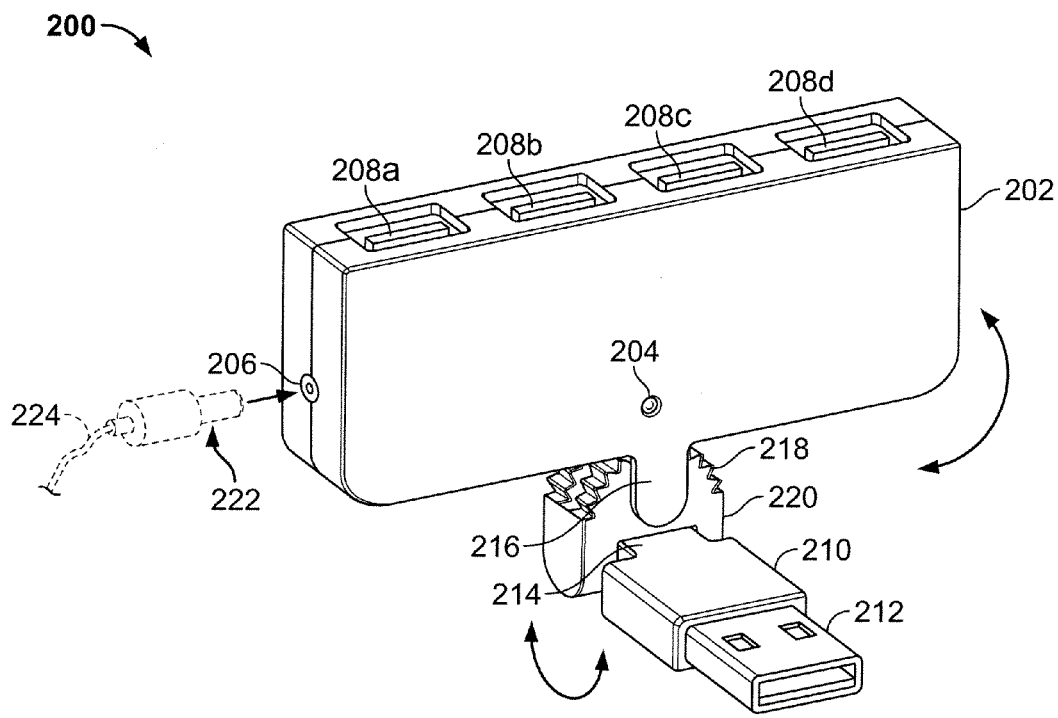
FIGS. 2A and 2B are perspective views of an exemplary embodiment of a rotatable USB hub apparatus.
Figure 2B:
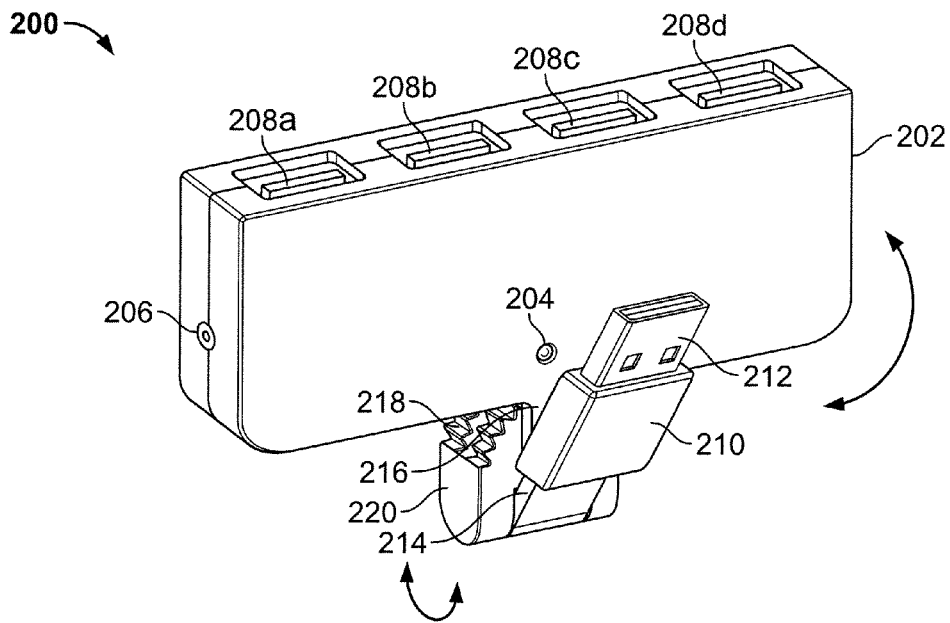

FIGS. 2A-2B are perspective views of an exemplary embodiment of a rotatable connector hub apparatus 200 comprising a first body or USB hub 202 that rotates along two different axes from a second body or molded connector cover 210 that in turn comprises an upstream connector or serial connector head or male type "A" USB plug 212. In FIG. 2A, the USB hub 202 and the USB plug 212 are at approximately 90 degrees with respect to each other, while in FIG. 2B, the USB hub 202 and the USB plug 212 are at about 45 degrees with respect to each other.

The hub apparatus 200 further comprises a second body 210 and an intermediate body or ratcheting connector 220. The USB hub 202 comprises four accessible downstream connectors or slots that are female type "A" USB port connectors 208a-208d, an optional indicator 204, an optional power connector 206, and a first hinge or joint or U-shaped tab 216. The tab 216 is attached to the ratcheting connector 220 by a pin (not shown) that passes through a hole in the ratcheting connector 220, though in other embodiments, other fastening devices such as a threaded screw or the like can be used as a method of attachment. The ratcheting connector 220 comprises a rotatable gears 218 that is attached to the tab 216. The use of the tab 216 allows the USB hub 202 to be rotated in two directions (clockwise and counterclockwise) about the ratcheting connector 220. Molded cover 210 is similarly rotationally attached to the ratcheting connector 220 by a second hinge or joint or swivel mount 214. The use of the swivel mount 214 allows the molded cover 210 to be rotated in two opposite directions (clockwise and counterclockwise) about the ratcheting connector 220. One of skill in the art will recognize that in other embodiments, the USB hub 202 can comprise a different number of downstream ports and the molded connector 210 can comprise more than one USB connector plug 212.

As shown in FIG. 2A, USB plug 212 is rotated ninety degrees from the USB hub 202 in a first plane and the tab 216 is pointing straight down towards molded cover 210. In this embodiment, USB plug 212 is at a first angle with respect to USB hub 202. The first angle can comprise a linear range of rotation angles (i.e., there are no stops or predetermined angles). In FIG. 2B, USB plug 212 has been rotated so that the first angle is approximately equal to 45 degrees. In other embodiments, the ratcheting connector 220 contains a latching mechanism (not shown) within the interface with the swivel mount 214 that limits the available angles of rotation of the molded connector 210 and USB plug 212 to a first set of predetermined positions within a first plane. That is, the first angle of rotation can comprise a first set of preconfigured angles of rotation that is determined by the configuration of the latching mechanism. The use of the preconfigured angle allows the molded connector 210 to remain stationary at a particular angle with respect to the ratcheting connector 220 until the user affirmatively changes the angle. The embodiment also prevents the first angle from changing if there is any unintentional movement of the apparatus by the user or another source of movement, such as vibration, etc.

Returning to FIG. 2B, the molded connector 210 can rotate a second angle about the ratcheting connector 220 within a second plane that is perpendicular to the first plane, independently of any particular first angle selected by the user. The actual range achievable in a particular embodiment is limited in part by the number of gears 218 that ratcheting connector 220 comprises and by tab 216 contacting molded cover 210 if USB hub 202 is rotated too far to the left or right from the vertical position illustrated in FIGS. 2A and 2B. In contrast to the first angle that can comprise a continuous range of rotation angles in FIGS. 2A and 2B, the second angle comprises a second set of predetermined positions within a second plane. That is, the second angle of rotation can comprise a second set of preconfigured angles of rotation that is determined by the number and spacing of the teeth that comprise gears 218. The use of the preconfigured second angle allows the USB hub 202 to remain stationary at a particular angle with respect to the ratcheting connector 220 until the user affirmatively changes the angle. As described above with respect to the first angle, the embodiment also prevents the first angle from changing if there is any unintentional movement of the apparatus by the user or another source of movement, such as vibration, etc.

In FIG. 2B, power connector 222 is shown detached from power connector 206. In this bus-powered mode of operation, the hub apparatus 200 can support low power USB devices such as a computer mouse or a keyboard that can be connected to USB port connectors 208a-208d. Optional power plug 222 comprises power cable 224 that can be attached to a variety of suitable power sources such as an AC wall transformer, a battery pack or an automobile cigarette lighter adapter. When power connector 222 is removably attached to power connector 206 and the power cable 224 is attached to such a compatible power source, the USB hub 202 can be utilized in the self-powered mode. In this mode, the hub apparatus 200 can support high power USB devices that can be connected to USB port connectors 208a-208d. In another embodiment (not shown), one or more of the downstream connectors 208a-208d can comprise a slot for receiving a memory card or the like. The USB hub 202 in turn contains an internal memory device reader that communicates with a laptop computer 300 (see FIG. 3) or other compatible device via a removable connection with the USB plug 212.

The indicator 204 can comprise an optional mono-colored Light Emitting Diode ("LED") that illuminates when the USB hub 202 is connected to an upstream signal through USB plug 212. In other embodiments, indicator 204 is a multicolored LED that glows one color when there is an upstream port connection through USB plug 212 and glows a second color when there is at least one USB peripheral or other downstream USB device operatively connected to one or more of USB port connectors 208a-208d. One skilled in the art will recognize that many variations of the use of indicator 204 are possible in other embodiments, such as the hub 202 having a plurality of multicolored LEDs (or other types of light sources) that change colors when the individual USB port connectors 208a-208d are connected to the hub or when DC power is supplied to the hub through power connector 206.

Figure 3:
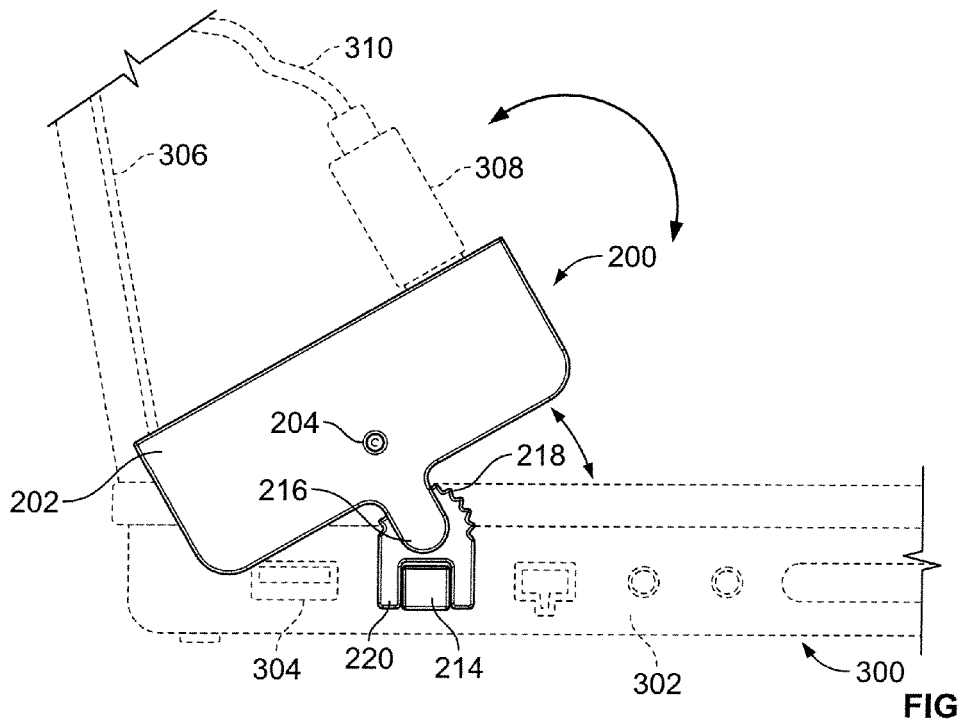
FIG. 3 is a perspective view of the rotatable USB hub apparatus removably attached to a USB port on a laptop computer.

FIG. 3 is a perspective view of the rotatable USB hub apparatus 200 removably attached to a USB port (not shown) on a laptop computer 300. The laptop computer comprises laptop computer base 302 and display screen 306. The side panel of the computer base 302 is visible in FIG. 3, as are a variety of connectors and jacks, including a USB connector 304. In this embodiment, the USB hub apparatus 200 shown is essentially the same as the embodiment of FIGS. 2A-2B. The Differences illustrated are: 1) the USB connector 212 (not shown) is operatively connected to a USB port connector (not shown) on the laptop computer 300; and 2) a USB connector 308 is shown operatively connected to one of the USB port connectors 208a-208d (not shown) of the USB hub 202. USB connector plug 308 comprises USB cable 310. A variety of USB compatible devices can be operatively connected to the USB hub 202, such as USB keyboards, mice, scanners, printers, flash memory devices, music players, and the like. One of skill in the art will recognize that the USB plug 212 can be operatively connected to compatible USB port connectors attached to a variety of devices, including a USB connector located at the downstream end of another USB hub (e.g., "daisy chaining" or "stacking" of USB hubs in series).

In FIG. 3, the USB hub 202 is shown rotated to approximately 45 degrees from the horizontal X axis in the X-Y plane and ratcheting connector 220 is shown perpendicular to the swivel mount 214 and USB plug 212 (see FIGS. 2A and 2B). This particular positioning of the hub apparatus 200 can prevent a clearance problem with a USB device or plug that is connected to USB connector port 304 while the hub apparatus 200 is also connected to a USB connector port on the computer base 302 (as opposed to the USB hub 202 being rotated an angle of less than 45 degrees from the X axis). This of course is merely one particular set of positions of the hub apparatus 200 that can resolve a clearance problem with a USB device or plug that is connected to USB connector port 304, and other rotational positions are possible.

Figure 4:
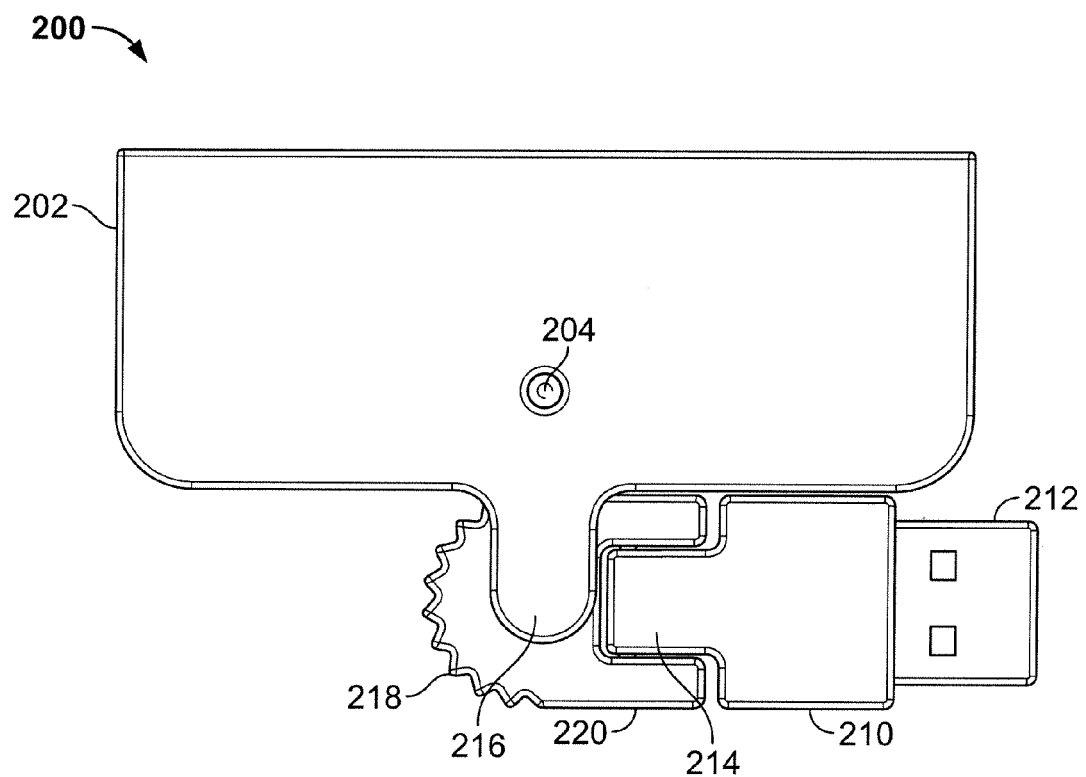
FIG. 4 is a front elevational view of the rotatable USB hub apparatus folded into a compact shape.

FIG. 4 is a front elevational view of the rotatable USB hub apparatus 200 folded into a compact shape. This configuration minimizes the physical "foot print" or "form factor" of the hub apparatus 200 to save space and is especially useful for traveling purposes when the hub assembly is disconnected and stored in the user's luggage, computer case, briefcase, etc. The user can have access to both the downstream port connectors 208a-208d and the USB plug 212 while the hub apparatus 200 is in the compact configuration, so that the hub apparatus 200 is still operational. That is, if the orientation of the downstream port connectors 208a-208d (see FIGS. 2A and 2B) with respect to the orientation of the upstream port connector 212 allow adequate clearance to adjacent ports for a given application, then the hub assembly 200 can be electrically operated. To achieve this minimum configuration size of the hub assembly 200, the molded connector 210 and USB plug 212 are rotated to be in the same plane as the axis of rotation of the USB hub 202. The USB hub 202 is then rotated about the gears 218 until the lower portion of the hub 202 touches one edge of the molded cover 210. One of skill in the art will recognize that the hub apparatus 200 can be folded into other compact shapes by utilizing different sets of angles of rotation of the USB hub 202 with respect to the ratcheting connector 220 and of the molded connector 210 with respect to the ratcheting connector 220. For example, in FIG. 4, the USB plug 212 is located at the right portion of the USB hub 202, but the first angle of rotation can be easily altered so that USB plug 212 can be located at the left portion of the USB hub 202.

Having thus described a preferred embodiment of a rotatable connector hub apparatus, it should be apparent to those skilled in the art that certain advantages of the invention have been achieved. For example, the hub can be easily positioned in a variety of configurations to avoid clearance and connector orientation problems with adjacent ports and connectors when the hub is connected to another device, but it should also be appreciated that various modifications, adaptations, and alternative embodiments thereof may be made within the scope and spirit of the present invention. For example, USB (as defined, for example, in the USB 2.0 specification), FireWire (as defined in the I.E.E.E. 1394 standard), Blue-Tooth (as defined in the BlueTooth specification and published by the BlueTooth Special Interest Group), RS232, PS2, and fiber optic connectors are all within the scope of the invention and the claims below.

What is claimed is:

1. A connector hub system, comprising:
   a first body comprising a plurality of connectors accessible from a surface of the first body, an indicator light, and a power connector for providing power to the plurality of connectors, at least one of the plurality of connectors comprising a slot for receiving a universal serial bus connector;
   a second body comprising a connector operatively coupled to the plurality of connectors, the connector comprising a serial connector head;
   a ratcheting mechanism that comprises a plurality of gears and allows the first body to rotate to a first set of predetermined positions within a first plane, the ratcheting mechanism being adapted to maintain the first body in a user selected one of the first set of predetermined positions until the user affirmatively moves the first body to another one of the first set of predetermined positions by rotating the first body over at least one of the plurality of gears, thereby moving the first body from a first position between a first set of adjacent ones of the plurality of gears to a second position between a second set of adjacent ones of the plurality of gears; and
   a hinge that allows the second body to rotate to a second set of predetermined positions within a second plane, the second plane being perpendicular with respect to the first plane.

2. The system as recited in claim 1, wherein the ratcheting mechanism and the hinge are attached to an intermediate body located in between the first and second bodies.

3. The system as recited in claim 1, wherein the hinge is adapted to maintain the second body in a user selected one of the second set of predetermined positions until the user affirmatively moves the second body to another one of the second set of predetermined positions.

4. A connector hub system, comprising:
   a first body with at least one connector, an indicator light, and a power connector for providing power to the at least one connector;
   a second body with a connector operatively coupled to the at least one connector;
   a ratcheting mechanism that comprises a plurality of gears and allows the first body to rotate to a first set of predetermined positions within a first plane, wherein said first body is rotated from a first one of the first set of predetermined positions to a second one of the first set of predetermined positions by rotating the first body over at least one of the plurality of gears; and
   a hinge that allows the second body to rotate within a second plane that is perpendicular with respect to the first plane.

5. The system as recited in claim 4, wherein the ratcheting mechanism and the hinge are attached to an intermediate body located in between the first and second bodies.

6. The system as recited in claim 4, wherein the ratcheting mechanism is adapted to maintain the first body in a user selected one of the first set of predetermined positions until the user affirmatively moves the first body to another one of the first set of predetermined positions.

7. The system as recited in claim 4, wherein the hinge is adapted to maintain the second body in a user selected one of the second set of predetermined positions until the user affirmatively moves the second body to another one of the second set of predetermined positions.

8. The system as recited in claim 4, wherein the at least one connector comprises a universal serial bus connector.

9. The system as recited in claim 8, wherein the universal serial bus connector comprises a slot for receiving a serial connector head.

10. The system as recited in claim 4, wherein the connector comprises a universal serial bus connector.

11. The system as recited in claim 10, wherein the universal serial bus connector comprises a serial connector head.

12. A connector hub apparatus, comprising:
   a first body with at least one connector, an indicator light, and a power connector;
   a second body with a connector operatively coupled to the at least one connector;
   a first joint that comprises a first set of gears and allows the first body to rotate to a first set of predetermined positions, wherein said first body is rotated from a first one of the first set of predetermined positions to a second one of the first set of predetermined positions by rotating the first body over at least one of the plurality of gears; and
   a second joint that comprises a second set of gears and allows the second body to rotate to a second set of predetermined positions.

13. The apparatus as recited in claim 12, wherein the first joint allows the first body to rotate within a first plane.

14. The apparatus as recited in claim 13, wherein the second joint allows the second body to rotate within a second plane that is perpendicular with respect to the first plane.

15. The apparatus as recited in claim 12, wherein the first and second joints are attached to an intermediate body located in between the first and second bodies.

16. The apparatus as recited in claim 12, wherein the first joint is adapted to maintain the first body in a user selected one of the first set of predetermined positions until the user affirmatively moves the first body to another one of the first set of predetermined positions by rotating the first body over at least one of the first set of gears.

17. The apparatus as recited in claim 12, wherein the second joint is adapted to maintain the second body in a user selected one of the second set of predetermined positions until the user affirmatively moves the second body to another one of the second set of predetermined positions by rotating the second body over at least one of the second set of gears.

18. The apparatus as recited in claim 12, wherein the at least one connector comprises a universal serial bus connector.

19. The apparatus as recited in claim 18, wherein the universal serial bus connector comprises a slot for receiving a serial connector head.

20. The apparatus as recited in claim 12, wherein the connector comprises a universal serial bus connector.

21. The apparatus as recited in claim 20, wherein the universal serial bus connector comprises a serial connector head.

* * * * *